(12) United States Patent
Kuzuu

(10) Patent No.: US 6,786,029 B2
(45) Date of Patent: Sep. 7, 2004

(54) PET NAIL COVER

(75) Inventor: Masayuki Kuzuu, Tochigi (JP)

(73) Assignee: Yuko Kuzuu, Tochigi (JP)

( * ) Notice: Subject to any disclaimer, the term of this patent is extended or adjusted under 35 U.S.C. 154(b) by 0 days.

(21) Appl. No.: 10/436,725

(22) Filed: May 12, 2003

(65) Prior Publication Data

US 2003/0217702 A1 Nov. 27, 2003

(30) Foreign Application Priority Data

May 23, 2002 (JP) ........................................ 2002-186879

(51) Int. Cl.$^7$ ................................................ B68C 5/00
(52) U.S. Cl. .......................................... 54/82; 119/856
(58) Field of Search ................. 119/851, 853, 119/856; 54/82; D30/146

(56) References Cited

U.S. PATENT DOCUMENTS

| | | | | | |
|---|---|---|---|---|---|
| 519,047 | A | * | 5/1894 | Rogers | 168/2 |
| 2,028,674 | A | * | 1/1936 | Larson | 119/851 |
| D108,491 | S | * | 2/1938 | Ford et al. | D30/146 |
| D111,783 | S | * | 10/1938 | Cadous | D2/919 |
| 2,424,172 | A | * | 7/1947 | Huddleston | 54/82 |
| 2,443,831 | A | * | 6/1948 | Miller | 54/79.1 |
| 2,651,853 | A | * | 9/1953 | Peter | 36/111 |
| 2,803,894 | A | * | 8/1957 | Morgan | 36/11.5 |
| D223,369 | S | * | 4/1972 | Jackson | D30/146 |
| D229,197 | S | * | 11/1973 | Jackson | D30/146 |
| 4,470,466 | A | * | 9/1984 | Nakanishi | 54/82 |
| 4,543,911 | A | * | 10/1985 | Marshall | 54/82 |
| 4,962,731 | A | * | 10/1990 | Wexler | 119/851 |
| 4,967,542 | A | * | 11/1990 | MacDonald | 54/82 |
| 5,406,722 | A | * | 4/1995 | Jones | 119/853 |
| D387,511 | S | * | 12/1997 | Caditz | D30/146 |
| D417,530 | S | * | 12/1999 | Danek | D30/146 |
| 6,058,891 | A | * | 5/2000 | Simonson et al. | 119/851 |
| 6,083,185 | A | * | 7/2000 | Lamont | 602/65 |
| 6,546,704 | B1 | * | 4/2003 | Fisher | 54/82 |
| 2003/0145805 | A1 | * | 8/2003 | Gat | 119/851 |

* cited by examiner

Primary Examiner—Charles T. Jordan
Assistant Examiner—Judith A. Nelson
(74) Attorney, Agent, or Firm—Leighton K. Chong; Ostrager Chong & Flaherty (Hawaii)

(57) ABSTRACT

A pet nail cover has a sack portion that is shaped and dimensioned so as to cover at least the main toe and nail of the animal and extends into a groove between the toe's small flesh pad and a large flesh pad on the bottom of the animal's foot, thereby leaving the large flesh pad exposed, allowing for the animal's traction, mobility and comfort. The pet nail cover eliminates scratches on wooden floor surfaces made by a pet's nails, scratching or scarring on the eyes and ears of the animal, and allows the animal to run with traction and mobility on indoor floor surfaces without slipping. It is attached to the animal with a fastener portion secured around the ankle portion of the animal's leg. It may also have ventilation holes in the nail cover surface for comfort.

12 Claims, 1 Drawing Sheet

PET NAIL COVER

TECHNICAL FIELD

This invention generally relates to pet accessories, and more particularly, to a nail cover for domesticated pets such as dogs or cats.

BACKGROUND OF INVENTION

Dogs and cats are now common members of the average household, well suited in most respects to domestication. However, while their manner and temperament may have suitably adapted to indoor living, their claws remain a vestige of the wild. Pet claws can cause damage to finished wooden floors, to household furniture, and even to the pets themselves, sometimes [often] scarring the animal's eyes or ears.

Present solutions to "domesticate" animal claws run from extreme and expensive—declawing the animal—to timely and tedious—daily trimming. Other solutions, turning evolution on its head, have tried to adapt the pet's feet to human implements with the introduction of pet "boots" and "socks". Fashionable as they may be, animal "boots" and "socks" come at the cost of the animal's mobility and comfort. By completely covering the animal's whole foot, these human-like implements ignore the role of the animal's footpad for maintaining balance and traction and increase the likelihood of the animal slipping on an indoor surface.

Pet owners currently lack the means to efficiently prevent damage from animal claws while ensuring their pet's mobility and comfort, allowing it to run freely on indoor surfaces without slipping.

SUMMARY OF INVENTION

In accordance with the present invention, a pet nail cover for domesticated animals if formed with a sack portion covering at least the main toe and nail of the animal and extending into a groove between the toe's small flesh pad and a large flesh pad on the bottom of the animal's foot, thereby leaving the large flesh pad exposed, and allowing for the animal's traction, mobility and comfort. In a preferred embodiment, the sack covers all four toes and nails of the animal apart from its dew claw, and further extends to a fastener portion which fastens around the ankle portion of the animal's leg.

The pet nail cover of the invention provides a practical solution to household damage commonly associated with pet ownership without the disadvantages and discomfort of the traditional animal "boot". The pet nail cover is perfect for domesticated pets such as dogs and cats. As its name suggests, it covers the nails of the animal, preventing the pet from scratching floors or furniture, while leaving the footpad exposed, minimizing inhibitions to traction.

The pet nail cover utilizes the unique anatomical structures of the animal to stay on the pet's foot. It is placed onto the pet, first, by inserting the animal's nail and toes into the pouch, which is secured by an elastic edge that fits into the ridge between the animal's toes and foot. The pouch completely covers the animal's nail and wholly or partially covers the animal's toes, leaving the large flesh pad exposed. Next, the pet nail cover is fastened around the animal's lower leg, using for example a hook and loop fastener strap to secure it in place. This structure leaves the animal's footpad exposed, allowing the animal to still maintain traction, but eliminates concomitant abrasion from its nails.

Other objects, features, and advantages of the present invention will be explained in the following detailed description of the invention of the invention having reference to the appended drawings.

DETAILED DESCRIPTION OF INVENTION

Figure 1:
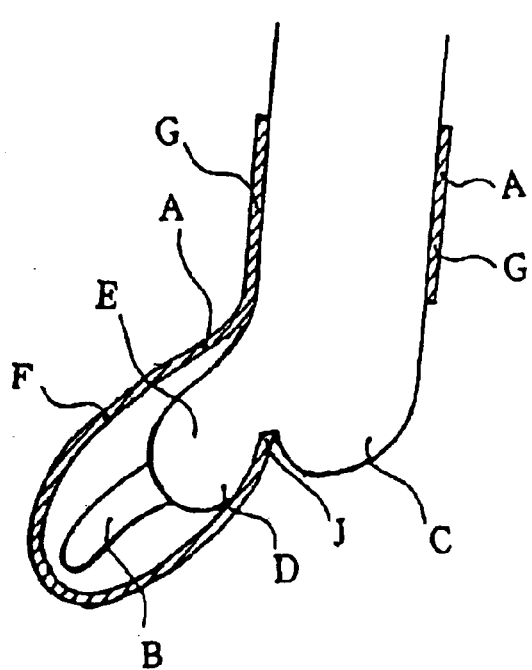
FIG. 1 is a diagram depicting a cross-section of the pet nail cover.
Figure 2:
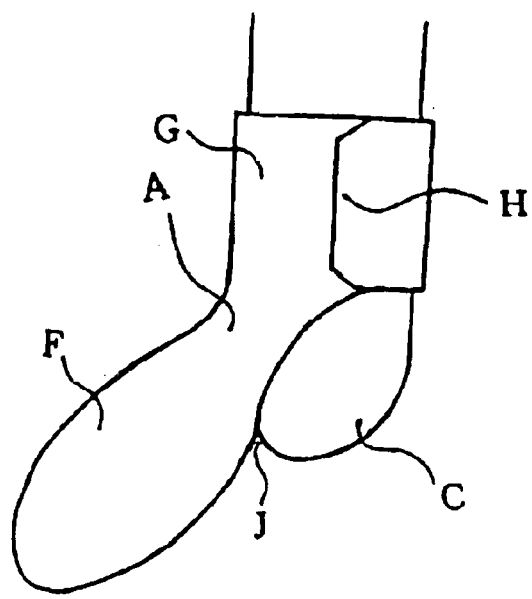
FIG. 2 is a diagram depicting the pet nail cover installed on the pet's foot.

Referring to FIGS. 1 and 2, a preferred embodiment of the pet nail cover (A) is dimensioned to fit over the claws (B) of domestic animals such as dogs and cats. The pet nail cover (A) is shaped and is used by inserting the flat portion of the sack's (F) edge in the groove (J) between the flesh (D) on the toe (E), where the nail is attached, and the large flesh pad (C) that such animals have on the bottom of the foot. The invention uses the groove (J) as a base for holding the "nail cover" sack (F) in position to cover the main toe or toes or all four toes of the animal (apart from its dew claw) including the nail (B) and a portion of small flesh pad (D) of each toe. In the preferred embodiment, the sack (F) is configured to cover the four main adjacent toes of the animal. With the toes inserted into the sack, the nail cover is fastened to the animal using a fastener (H) which may consist of a hook and loop fastener, zipper, snap, or the like on a belt loop (G) provided at the edge of a fastener portion extending from the sack (F) and secured around the ankle part of the animal's leg.

Other embodiments may cover the nails (B) and small flesh pad (D) on each toe (E) individually or the adjacent main toes of the animal that have the large claws. Using that configuration, the nail cover is placed on the animal by again inserting the flat portion of the sack's (F) edge in the groove (J) between the balls of flesh (D) on the covered toe or toes (E), where the nail is attached, and the large flesh pad (C) on the bottom of the foot. The sack covers the nail or nails (B) in the sack (F) by wrapping the sack (F) over the adjacent toes (E) including the nail (B) and the flesh pad (D). In some instances, the nail cover sack (F) may also cover the animal's dew claw.

In the interest of the animal's comfort, the preferred embodiments can have multiple ventilations on the surface of the nail cover sack (F) to improve air circulation to the covered area. The nail cover sack (F) and fastener portion (G) can be made of soft or elastic rubber, soft or elastic synthetic rubber, soft or elastic synthetic fiber, or other types of soft or elastic high molecular compound, or alternatively, it can be made from textile.

It is understood that many modifications and variations may be devised given the above description of the principles of the invention. It is intended that all such modifications and variations be considered as within the spirit and scope of this invention, as defined in the following claims.

What is claimed is:

1. A pet nail cover for domesticated animals comprising:
   a) a sack portion that is shaped and dimensioned covering at least the main toe and nail of the animal and extending into a groove between the toe's small flesh pad and a large flesh pad on the bottom of the animal's foot,
   b) said sack portion having an aperature formed at a botton portion of the sack which is shaped and dimensioned to leave the large flesh pad exposed to the ground, thereby allowing for the animal's traction, mobility, and comfort.

2. A pet nail cover according to claim 1, wherein the sack covers all four adjacent toes of the animal.

3. A pet nail cover according to claim 1, wherein the sack portion extends to a fastener portion over an upper part of the animal's foot having means for securing the sack portion around or near an ankle portion of the animal's foot.

4. A pet nail cover according to claim 2, wherein the sack portion extends to a fastener portion over an upper part of the animal's foot having means for securing the sack portion around or near an ankle portion of the animal's foot.

5. A pet nail cover according to claim 3 wherein the fastener portion is made of one of the group of materials consisting of: soft or elastic rubber; soft or elastic synthetic rubber; soft or synthetic fiber; soft or elastic material of high molecular compound; and textile.

6. A pet nail cover according to claim 4 wherein the fastener portion is made of one of the group of materials consisting of: soft or elastic rubber; soft or elastic synthetic rubber; soft or synthetic fiber; soft or elastic material of high molecular compound; and textile.

7. A pet nail cover according to claim 1 wherein the fastener portion is made of one of the group of materials consisting of: soft or elastic rubber; soft or elastic synthetic rubber; soft or synthetic fiber; soft or elastic material of high molecular compound; and textile.

8. A pet nail cover according to claim 2 wherein the fastener portion is made of one of the group of materials consisting of: soft or elastic rubber; soft or elastic synthetic rubber; soft or synthetic fiber; soft or elastic material of high molecular compound; and textile.

9. A pet nail cover according to claim 1 wherein the sack portion has multiple ventilations on an outer surface of the sack to improve air circulation to the covered areas.

10. A pet nail cover according to claim 2 wherein the sack portion has multiple ventilations on an outer surface of the sack to improve air circulation to the covered areas.

11. A pet nail cover according to claim 1 wherein the sack portion has multiple ventilations on an outer surface of the sack to improve air circulation to the covered areas.

12. A pet nail cover according to claim 3 wherein the sack portion has multiple ventilations on an outer surface of the sack to improve air circulation to the covered areas.

* * * * *